Feb. 23, 1932. E. O. SCHWEITZER 1,846,070
CABLE CONSTRUCTION
Filed May 3, 1926   3 Sheets-Sheet 1

Inventor
Edmund O. Schweitzer
By Brown Boettcher Dienner
Atty's.

Feb. 23, 1932. E. O. SCHWEITZER 1,846,070
CABLE CONSTRUCTION
Filed May 3, 1926 3 Sheets-Sheet 2
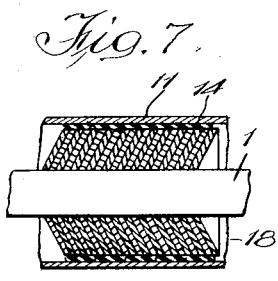
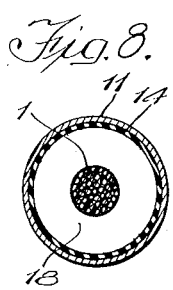
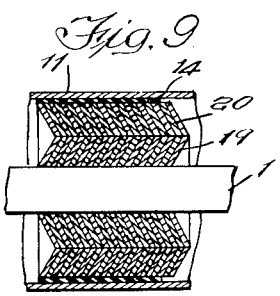
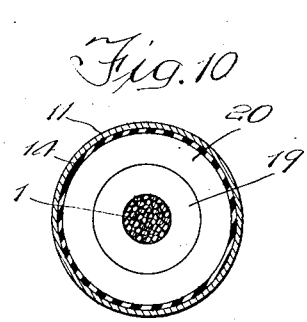
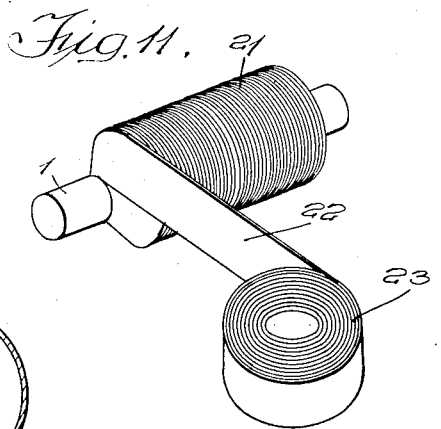
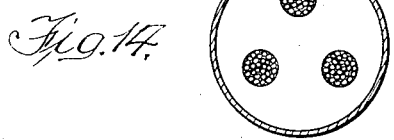
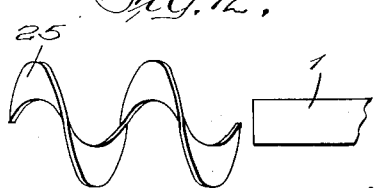
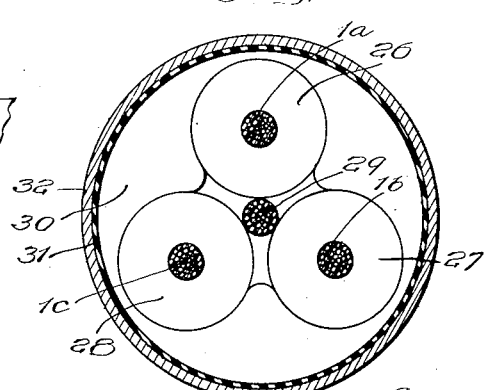
Witnesses:
William P. Kilroy
Harry R. L. White
Inventor
Edmund O. Schweitzer
Brown Boettcher - Brenner
By
Attys.

Feb. 23, 1932.  E. O. SCHWEITZER  1,846,070
CABLE CONSTRUCTION
Filed May 3, 1926  3 Sheets-Sheet 3
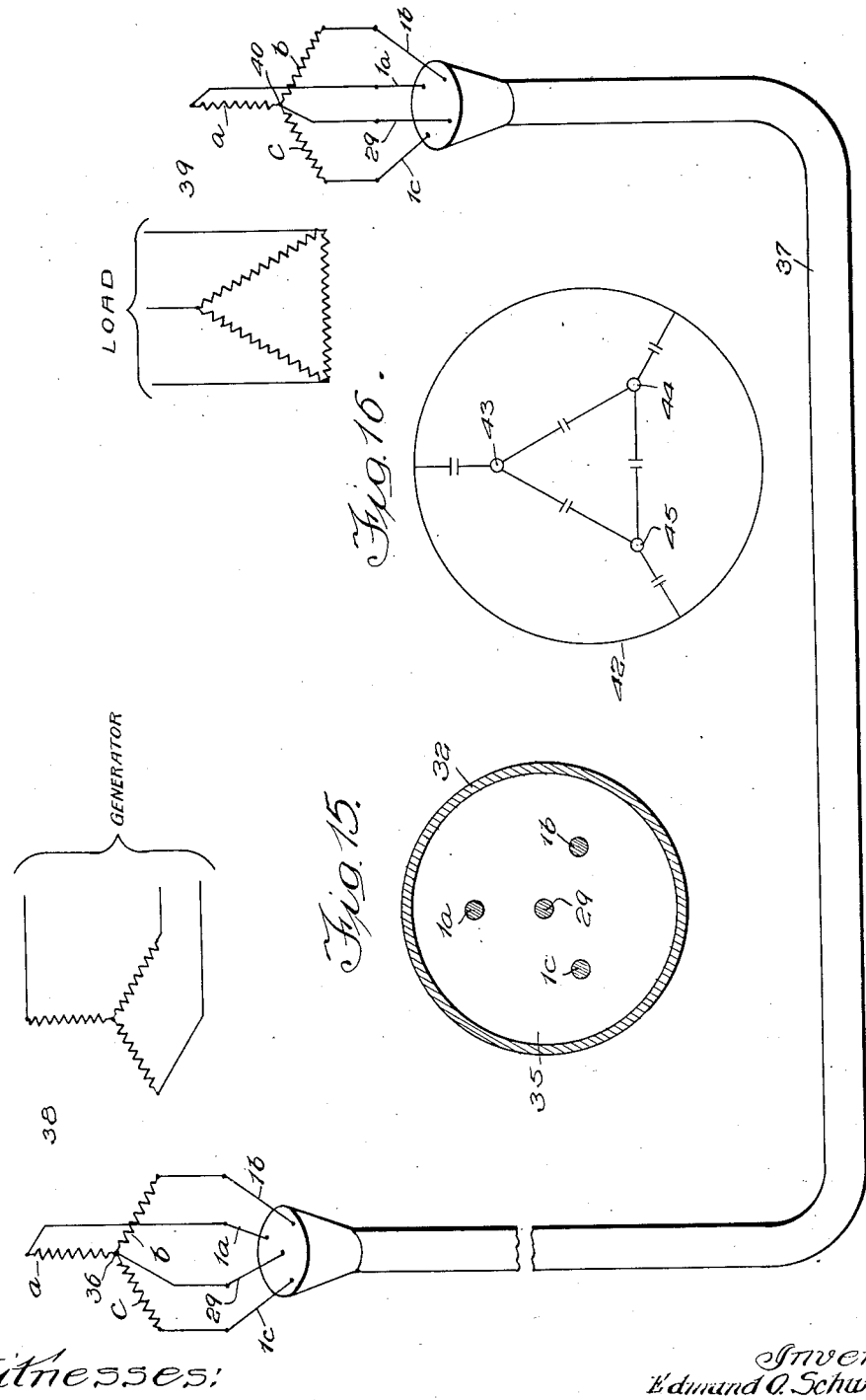

Patented Feb. 23, 1932

1,846,070

UNITED STATES PATENT OFFICE

EDMUND O. SCHWEITZER, OF CHICAGO, ILLINOIS

CABLE CONSTRUCTION

Application filed May 3, 1926. Serial No. 106,332.

My invention relates to the construction of electric cable for carrying power current.

It is a fact well known to engineers that cable for carrying power current, as now constructed, is unsatisfactory due to the many unknown factors involved in the construction of the same, particularly on higher voltages. The insulation of the conductor, which is interposed between the conductor and the lead sheath, which lead sheath is grounded, as now constructed consists of successive layers of fibrous insulating material wound upon the conductor and upon successive turns of the insulating material to make up the desired body of insulating material. This fibrous wrapper is generally impregnated with a semi-fluid hydrocarbon compound having insulating characteristics and intended to fill up all the pores or interstices in the fibrous insulating material and the space which is not occupied by such material.

I have observed that the tendency of a circumferentially wrapped body of insulation to break down may be explained in part by the fact that the tendency of the successive layers of wrapped insulation tend effectively to prevent complete permeation of the insulating material with the insulating compound and, further, that the tendency of the wrapping of the insulating material in a circumferential manner tends to entrap air, which it is extremely difficult to remove due to the fact that it is literally wrapped into the insulating material and prevented from coming out radially by the wrapping which holds it.

Another difficulty involved in cable constructed with insulation of the circumferentially wrapped type is that bending of the finished cable is highly injurious, as will at once be appreciated from the fact that paper or varnished cambric has substantially no extensibility before rupture, and anything except a large radius bend will quickly crack and damage the insulating wrapping.

It is also very difficult to coordinate the longitudinal and the circumferential movements of the wrapping so as to secure uniformity of insulation throughout the cable and, as a result, the cable will develop weaknesses under test or in use, although such weaknesses cannot be detected during the course of manufacture.

According to my invention I propose to laminate the insulating material radially or transversely as, for example, by threading insulating discs upon a conductor, these discs being adapted to be brought into contact with sufficient firmness to form a substantially continuous body of insulating material, or they may be threaded in loose contact with each other with an interposed film of a semi-fluid compound, and this is in fact the preferred manner of making up the cable so that it has a very considerable degree of flexibility without causing weakening of the insulation.

While I speak of radial or transverse laminations, I do not wish to exclude conical or spiral laminations, but intend to include all these as distinguished from circumferential laminations of the prior art.

As a further feature of my invention I provide a centrally disposed neutral conductor between phases of a three phase or the like cable which has the valuable property of reducing the electrostatic stresses upon the insulation primarily by permitting the free flow of circulating current required by an unbalanced load. While the introduction of this fourth conductor increases the initial cost of the cable, it is highly economical in the insurance which it provides against injury to the cable with possible consequent failure.

Now in order to acquaint those skilled in the art with the manner of constructing and operating a device embodying my invention, I shall describe in connection with the drawings attached hereto a specific embodiment of my invention.

In the drawings:—

Fig. 7 is a longitudinal sectional view of a modified form employing conical discs of insulating material;

Fig. 8 is an end view of the same;

Fig. 9 is a longitudinal sectional view of another modification;

Fig. 10 is an end view of the same;

Fig. 11 is a diagrammatic isometric illustration of another manner of applying the insulation so as to leave transverse laminations;

Fig. 12 is a diagrammatic view of a preformed insulating strip in helical form to be applied to a conductor;

Fig. 13 is a cross sectional view of a three phase high tension cable embodying my invention;

Fig. 14 is a cross sectional view of a cable in which the conductors are insulated by common transverse laminations;

Fig. 15 is a modification of my invention in which the electrostatic stresses are reduced;

Fig. 16 is a diagram of electrostatic stresses involved in a three phase cable of the prior art; and Fig. 17 is a diagram of a connected cable embodying my invention.

Figure 2:
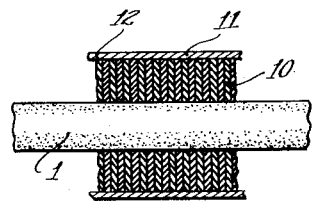
Fig. 2 is a fragmentary longitudinal section through a single conductor cable embodying my invention.
Figure 1:
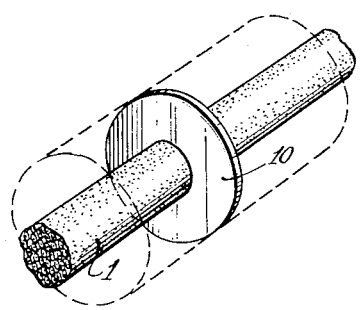
Fig. 1 is a perspective view of a conductor with one of my improved insulated washers disposed thereon.
Figure 3:
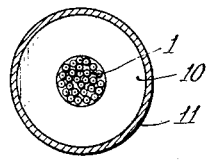
Fig. 3 is a cross sectional view of the same.

Now according to my invention, one form of which is shown in Figures 1 to 3, inclusive, I provide a series of washers 10 of insulating material, which are threaded upon the conductor 1 with their faces in contact. These washers may be, for example, a fibrous paper in contact, face to face, and adapted to be impregnated either before application or after application to the conductor 1, with a semi-fluid cable compound or insulating material with which the art is now familiar.

After the washers 10 are thus threaded upon the conductor 1, the lead sheath 11 may be applied directly on the outside of the washers, or an intervening wrapping of paper, cambric, or the like, may be interposed between the washers 10 and said lead sheath 11.

In the manufacture of this cable I may form the washers 10 from sheet material, either in the fibrous unimpregnated form or previously impregnated, if desired. Preferably I cut these discs out of the sheet or strip formed, for example, of paper made of manila rope fiber, and then impregnate the same with cable compound, and then successively thread these treated washers upon the stranded conductor 1 and bring them into contact with sufficient pressure to exclude air therebetween. Then, after these washers are all in place, a wrapping of fibrous insulating material on the outside of the same closes the outer end of the seams between laminations, and then the lead sheath is applied on the outside thereof.

As an alternative method of construction, I may put the washers in unimpregnated form upon the conductor, then subject the cable with the washers thereupon to vacuum, and then introduce impregnating compound into the fibrous paper under heat and pressure.

A highly desirable feature of the cable constructed in accordance with my invention resides in the fact that the resulting cable is first, substantially uniform in construction throughout and does not have the tendency to develop hot spots. Next, the cable is relatively elastic and will stand bending without danger to the insulating qualities of the insulation 12 made up of the washers 10.

Next, I wish to call attention to the fact that the flow of heat from the conductor 1 to the sheath 11 is promoted by the straight outward path, which is provided thru the washers 10. This is a highly desirable feature which is completely lacking in the cable of the prior art where the outward or radial travel of heat from the conductor is greatly impeded by the circumferential lamination.

The washers 10 may be made of any reasonable thickness consistent with suitable impregnation of the same, and are preferably made relatively thin so as to promote the flexibility of the resulting cable.

Where the washers 10 are impregnated before they are applied to the conductor, they may be subjected to heat as they are applied in order to form a close union, as they are pressed in place endwise or longitudinally of the conductor 1. These washers may be made integral, as shown in Figures 1 to 3, or they may be made with a slot, as indicated at 13, Fig. 4 to facilitate application to the conductor 1. The conductor 1 may be a hollow conductor to assist in applying the impregnating compound from both the inner periphery and the outer periphery.

Figure 4:
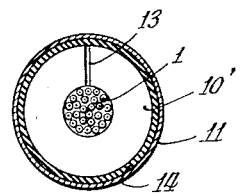
Fig. 4 is a cross sectional view of a modification.

In Figure 4 I have shown the intermediate wrapping 14 between the washer 10' and the lead sheath 11.

Figure 5:
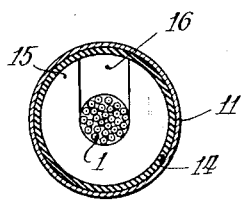
Figs. 5 and 6 are like cross sectional views of modifications.
Figure 6:
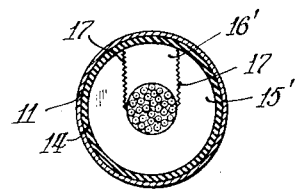

In Figure 5 I have shown the washer 15 as having a portion 16 slotted out so that the washer may be applied in two parts, as shown in that figure. Obviously, the washer might be split diametrically with the joints of adjacent washers out of register, as will be apparent to those skilled in the art. In Figure 6 I have shown the edges of the smaller section 16' and the edges of the larger section 15' as provided with interfitting teeth, as shown at 17, so as to prevent mechanical displacement of the two sections with respect to each other, and to provide a longer creepage path at the joint between the two.

In Figures 7 and 8 I have shown the washers as conical or dished in form, these conical washers 18 being either integral or slotted, as shown in the previous form, but the conical form provides a longer creepage path along the seam between adjacent washers.

The flow of heat is not materially retarded by this construction and the advantages above enumerated are retained.

It will be apparent that instead of employing a single washer between the conductor 1 and the sheath 11, the lamination may consist of an inner stack 19 and an outer stack 20, Fig. 9, or, in fact, as many stacks as may be desired to make up the requisite insulation between the conductor 1 and the sheath 11. These successive layers may be placed directly in contact with each other, or a circumferential helical wrapping of tape, paper, or the like, may be interposed between successive layers. The manner of application may be as previously described, that is, the washers may be unimpregnated when applied and then subjected to vacuum and treated with an impregnated compound under pressure for successive stacks or layers produced as above described, or the successive stacks or layers may be formed of previously treated washers put in place and pressed together with or without the application of heat.

I propose also to form the insulation from a continuous strip disposed edgewise upon the conductor, as shown in Figure 11, although I find this to be difficult of execution satisfactorily. The insulation 21 may be built up of a loose flexible strip 22 wrapped edgewise upon the conductor 1, as from the roll or spool 23. The body of insulation 21 may be subjected to the action of vacuum and impregnated with a compound under heat as above described.

The insulating medium for the conductor 1 may be made in the shape of a preformed strip of generally helical configuration, as shown at 25 in Figure 12, this strip being wound upon the conductor 1 and then compressed longitudinally of the conductor and subjected to vacuum and impregnation with a suitable insulating compound under heat and pressure, as above described, or it may be treated with insulating compound in advance of application and then fastened into place by heat and pressure. An outer flat wrapping of insulating material may be applied to the outer surface of the same and then a lead sheath applied.

In Figure 13 I have shown a three phase cable in which the conductors 1a, 1b and 1c are insulated with the discs or washers to form the insulations 26, 27 and 28. I have placed a balancing neutral conductor 29 at the center of the same between the three phase conductors 1a, 1b and 1c. I then apply outer punched discs 30 of insulation stacked as the discs for the phase insulation to hold the conductors and their insulation in place. Upon the outside of the stack 30 I may provide a wrapping 31 and outside of that the lead sheath 32.

I consider it within my invention to provide a unitary disc or plate having three openings for the three phase conductors, which may be stacked to provide insulation for all three phase conductors simultaneously, thus building up the complete insulation between phases from a single stack or a series of sections suitably interlocked and assembled at the same time.

In Figure 15 I have shown in section a modified form of cable in which the conductors 1a, 1b and 1c, and also the neutral conductor 29 are all insulated from each other and from the lead sheath 32 by common laminations 35. In this form the entire cable core is built up simultaneously. The laminations 35 either in unitary washers or plates or in segments are applied to all of the conductors simultaneously, so that each lamination forms a longitudinal step in the formation of the insulation. Obviously the conductors may have a helical lay as is customary in field construction.

In Figure 17 I have shown diagrammatically how the neutral conductor 29 is disposed in the cable and connected to the transformer or generator windings, as the case may be.

In this case the cable 37 is run between the generator transformer 38 and the load transformer 39. The phase conductors 1a, 1b and 1c are connected to the terminals of the series windings a, b and c at each of the transformers 38 and 39. The neutral conductor 29 is connected to the neutral point 36 of the transformer 38 and to the neutral point 40 of the transformer 39. The co-operating transformer windings in the transformers 38 and 39, respectively, may lead to the generator and to the load, or like electrical connections in a power transmission system in either direction.

The windings which are connected to the cable conductors are preferably connected in star as indicated in Figure 17. The co-operating windings may likewise be connected in star or in delta, as may be preferred, and if desired the neutral point of the co-operating windings may be connected to the neutral points 36 and 40. However, I employ the neutral conductor in the cables specifically for the purpose of equalizing the electrostatic stresses upon the insulation and such conductor is not essential outside of the cable itself. This neutral conductor, by carrying the necessary circulating current, in case of an unbalanced load permits the insulation to be loaded more evenly and subjected to more nearly uniform stresses than has heretofore been possible. Consider the diagram of Figure 16 where the outer circular line represents the cable sheath, and the conductors 43, 44 and 45 represent the phase conductors, separated from said sheath 42 by insulation and separated from each other likewise by insulation, it will be seen that there is a certain condenser effect between the conductors and the sheath tending to hold in phantom a neutral point X in the insulation with respect to the various conductors. This neutral point is not physically located in the insulation, it is merely a geometric point where the stresses are equal in the three directions. Obviously, if the load is unbalanced, the neutral point moves about in the insulation and the insulation is subject to unforeseen stresses because the voltage relation is disturbed by an unbalanced load.

In the cable of my invention I provide the neutral conductor 29 which physically is placed at the neutral or central point and which electrically holds the neutral at that point by permitting the circulating current to flow.

It is perhaps helpful to refer to a mechanical analogy. In the cable of the prior art an unbalanced load is like an unbalanced force on a rotative system. It induces stresses all out of proportion to normal calculated stresses. Now, in reality, a cable under high pressure is like a high speed rotative mechanical element, which so long as it is in balance can easily transmit the required power without danger of injury, but, in the case of unbalance of the load, acts like a mechanical system rotating at high speed out of dynamic balance. By permitting the circulating current to go through the neutral conductor 29, the neutral point is held substantially in fixed position with respect to the insulation, and the unbalance of pressures and stresses heretofore occurring in cables of the prior art is not permitted to develop.

I do not intend to be limited to the details shown and described.

I claim:—

1. In a cable, plurality of conductors, a series of apertured washers threaded on each conductor, a series of other apertured washers threaded over the washers threaded on the conductors, and a metallic sheath covering said other washers.

2. In a cable, the combination of a conductor and a series of relatively thin flexible dished apertured washers threaded on said conductor.

3. In a cable, the combination of a conductor and a series of relatively thin flexible dished apertured washers threaded on said conductor and insulating compound disposed between said washers.

4. In a cable, the combination of a conductor and a series of relatively thin flexible dished apertured washers threaded on said conductor and insulating compound disposed between said washers and a lead sheath surrounding washers.

In witness whereof, I hereunto subscribe my name this 21st day of April, 1926.

EDMUND O. SCHWEITZER.